US012726805B2

(12) United States Patent
Bonn et al.

(10) Patent No.: US 12,726,805 B2
(45) Date of Patent: Sep. 1, 2026

(54) METHODS AND SYSTEMS TO PROVIDE EMERGENCY TELECOMMUNICATIONS SERVICES TO EMERGENCY PERSONNEL USING VOICE VERIFICATION

(71) Applicant: T-Mobile Innovations LLC, Overland Park, KS (US)

(72) Inventors: Mark Bonn, Granite Bay, CA (US); Kenneth George, Fulshear, TX (US); Nauhman Gora, Irvine, CA (US); Dominick Mangiardi, Fremont, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 272 days.

(21) Appl. No.: 18/677,876

(22) Filed: May 30, 2024

(65) Prior Publication Data

US 2025/0374020 A1 Dec. 4, 2025

(51) Int. Cl.

| | |
|---|---|
| ***H04W 4/90*** | (2018.01) |
| ***G10L 17/22*** | (2013.01) |
| ***H04M 11/04*** | (2006.01) |

(52) U.S. Cl.

CPC ............... *H04W 4/90* (2018.02); *G10L 17/22* (2013.01); *H04M 11/045* (2013.01)

(58) Field of Classification Search

CPC ........ H04W 4/90; H04M 11/045; G10L 17/22

See application file for complete search history.

(56) References Cited

U.S. PATENT DOCUMENTS

| | | | | |
|---|---|---|---|---|
| 6,092,192 | A * | 7/2000 | Kanevsky | G07F 7/1008 713/172 |
| 2012/0253809 | A1* | 10/2012 | Thomas | G10L 17/24 704/E15.001 |
| 2013/0060954 | A1* | 3/2013 | Dahlqvist | H04L 65/1073 709/228 |
| 2023/0100259 | A1* | 3/2023 | Wang | G10L 15/02 704/200 |

OTHER PUBLICATIONS

Bonn, Mark, al., "Methods and Systems to Provide Optimized and Prioritized Telecommunications Services to Authorized Personnel," filed Dec. 11, 2024, U.S. Appl. No. 18/977,805.

Bonn, Mark, al., "Methods and Systems to Provide Emergency Telecommunications Services to Emergency Personnel Using Artificial Intelligence Based Authentication," filed Jun. 3, 2024, U.S. Appl. No. 18/732,333.

* cited by examiner

*Primary Examiner* — Lester G Kincaid

(57) ABSTRACT

A method comprises receiving a first call from a user device operated by an emergency personnel, receiving a personal identification number associated with the emergency personnel from the user device, validating the personal identification number by verifying that the personal identification number is stored at a data store in association with an active account, wherein the active account is associated with the emergency personnel, transmitting a first prompt for voice verification registration to the user device, receiving a response from the user device to perform the voice verification registration in response to the first prompt, and either performing voice verification with the user using the user device or transmitting a prompt for a requested destination to the user device based on the response.

5 Claims, 8 Drawing Sheets

Emergency Telecommunications Service System 109

Application 120

Data Store 123

User Account 125

PIN 129

Voice Verification Key 131

Permissions 134

Rules 135

Access History 137

Device ID 140

Authentication Type 143

Time Data 146

Loc. Data 149

Dest. Data 152

Voice Verification System 112

Verification Application 155

Data Store 158

Voice Data 164

Voiceprint (passphrase) 167

Voice Verification Key 131

103

Network 115

Access Network 106

RAN 117

Core Network 119

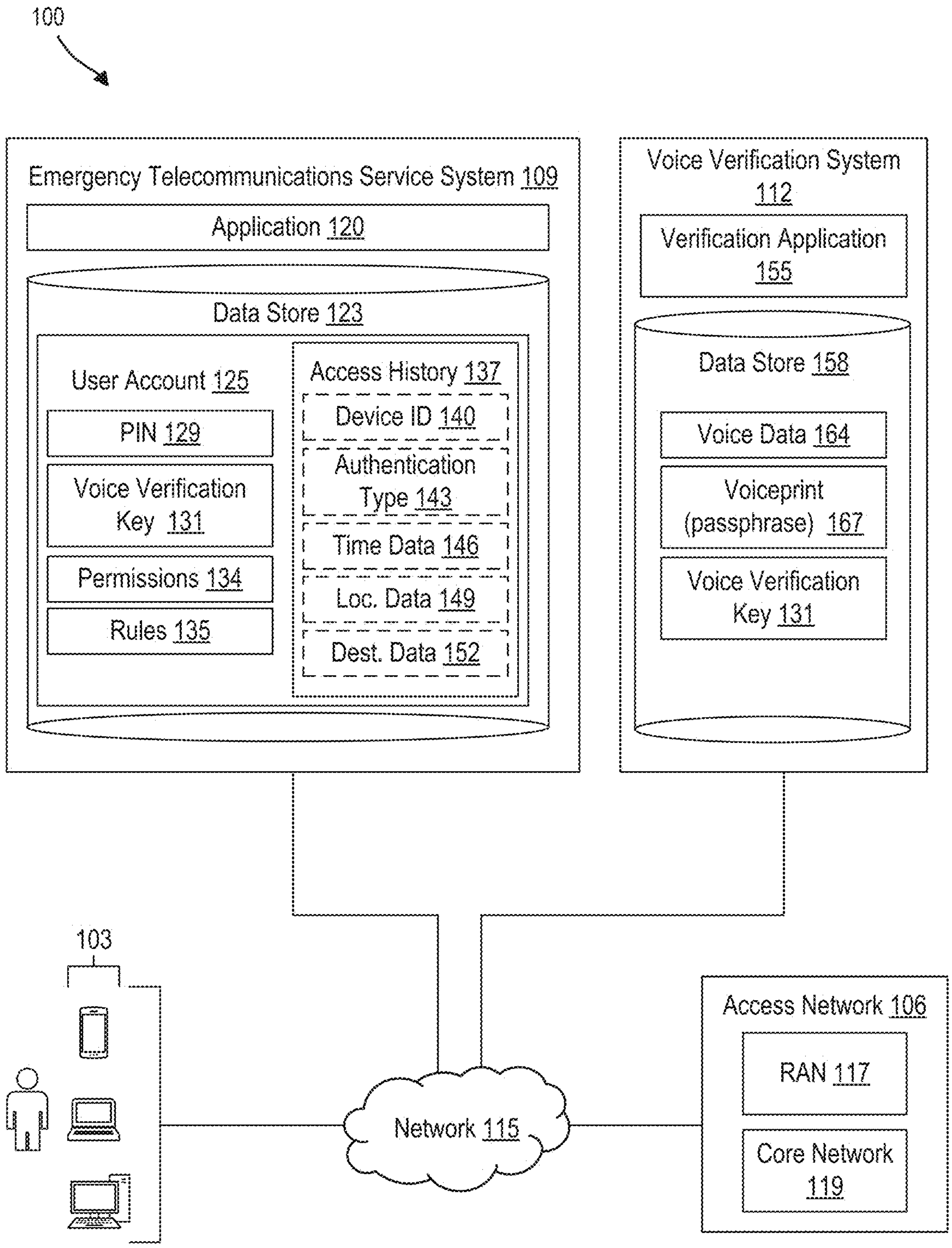

FIG. 1

METHODS AND SYSTEMS TO PROVIDE EMERGENCY TELECOMMUNICATIONS SERVICES TO EMERGENCY PERSONNEL USING VOICE VERIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Emergency telecommunications services, such as the Government Emergency Telecommunications Service (GETS), are priority telecommunication services provided by the government to ensure essential national security and emergency personnel have expedited access to communication networks and exemption to overload controls, resulting in an end-to-end priority service during emergency situations. For example, a GETS system providing GETS operates using existing telecommunication infrastructure and grants authorized users priority status by authenticating the emergency personnel who have valid accounts registered with the GETS system. This prioritized access ensures that critical communications from the emergency personnel are given precedence over non-priority communications and are not hindered by network congestion during emergency situations. In this way, the authorized emergency personnel can swiftly make and receive calls during emergency situations, enabling efficient and vital communication in times of heightened demand and resource contention. Said another way, the service enhances emergency response capabilities by prioritizing the connectivity of those directly involved in emergency management and national security efforts.

SUMMARY

In an embodiment, a method implemented in a communication network including an access network to provide Government Emergency Telecommunications Services using voice verification is disclosed. The method comprises receiving, by an application executed at a Government Emergency Telecommunications Service system, a personal identification number associated with an emergency personnel from a user device operated by the emergency personnel, and validating, by the application, the personal identification number by verifying that the personal identification number is stored at a data store in association with an active account, wherein the active account is associated with the emergency personnel. The method further comprises transmitting, by the application, a prompt for voice verification registration to the user device, and receiving, by the application, a confirmation from the user to perform the voice verification registration in association with the personal identification number in response to the prompt. The method further comprises performing, by the application, the voice verification registration in association with the personal identification number to obtain a voice verification key from a voice verification system, wherein the voice verification key is a value indicating that the emergency personnel associated with the personal identification number has registered for voice verification, and storing, by the application, the voice verification key in the active account. After the voice verification key has been stored in the active account, the method further comprises receiving, by the application, a voice passphrase from the user device, wherein the voice passphrase comprises a passphrase in a voice of the emergency personnel, transmitting, by the application, the voice passphrase to the voice verification system to determine whether the voice passphrase matches a voiceprint stored at the voice verification system, and completing, by the application, a call from the user device to a requested destination using the access network when the voice passphrase matches the voiceprint.

In another embodiment, a method implemented in a communication network including an access network to provide emergency telecommunications services using voice verification is disclosed. The method comprises receiving, by an application executed at an emergency telecommunications service system, a first call from a user device operated by an emergency personnel, receiving, by the application, a personal identification number associated with the emergency personnel from the user device, and validating, by the application, the personal identification number by verifying that the personal identification number is stored at a data store in association with an active account, wherein the active account is associated with the emergency personnel. The method further comprises transmitting, by the application, a first prompt for voice verification registration to the user device, receiving, by the application, a denial from the user device to perform the voice verification registration in response to the first prompt, transmitting, by the application, a prompt for a requested destination to the user device, and completing, by the application, a call from the user device to the requested destination using the access network. After completing the call, the method further comprises receiving, by the application, a second call from the user device, determining, by the application, whether to transmit a second prompt for the voice verification registration based on a rule, wherein the rule comprises a condition based on the first prompt transmitted to the user device, and transmitting, by the application, the second prompt to the user device when the condition of the rule is met.

In yet another embodiment, an emergency telecommunications system is disclosed. The emergency telecommunications system comprises a non-transitory memory, a processor coupled to the non-transitory memory, and an application stored at the non-transitory memory. The application, when executed by the processor, causes the processor to be configured to receive a call from a user device operated by an emergency personnel registered with the emergency telecommunications system, receive a voice passphrase from the user device, wherein the voice passphrase comprises a passphrase in the voice of the emergency personnel, store the voice passphrase in the non-transitory memory, transmit the voice passphrase to a voice verification system to determine whether the voice passphrase matches a voiceprint of a registered emergency personnel at the voice verification system, receive a voice verification key from the voice verification system, wherein the voice verification key is a value indicating that the emergency personnel has registered for voice verification to use the emergency telecommunications system, determine that the voice verification key is included in an account including a personal identification number associated with the emergency personnel, transmit a prompt for a requested destination to the user device, receive the requested destination from the user device, and complete the call from the user device to the requested destination using an access network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 is a block diagram of a communication system according to an embodiment of the disclosure.

DETAILED DESCRIPTION

Figure 2A:
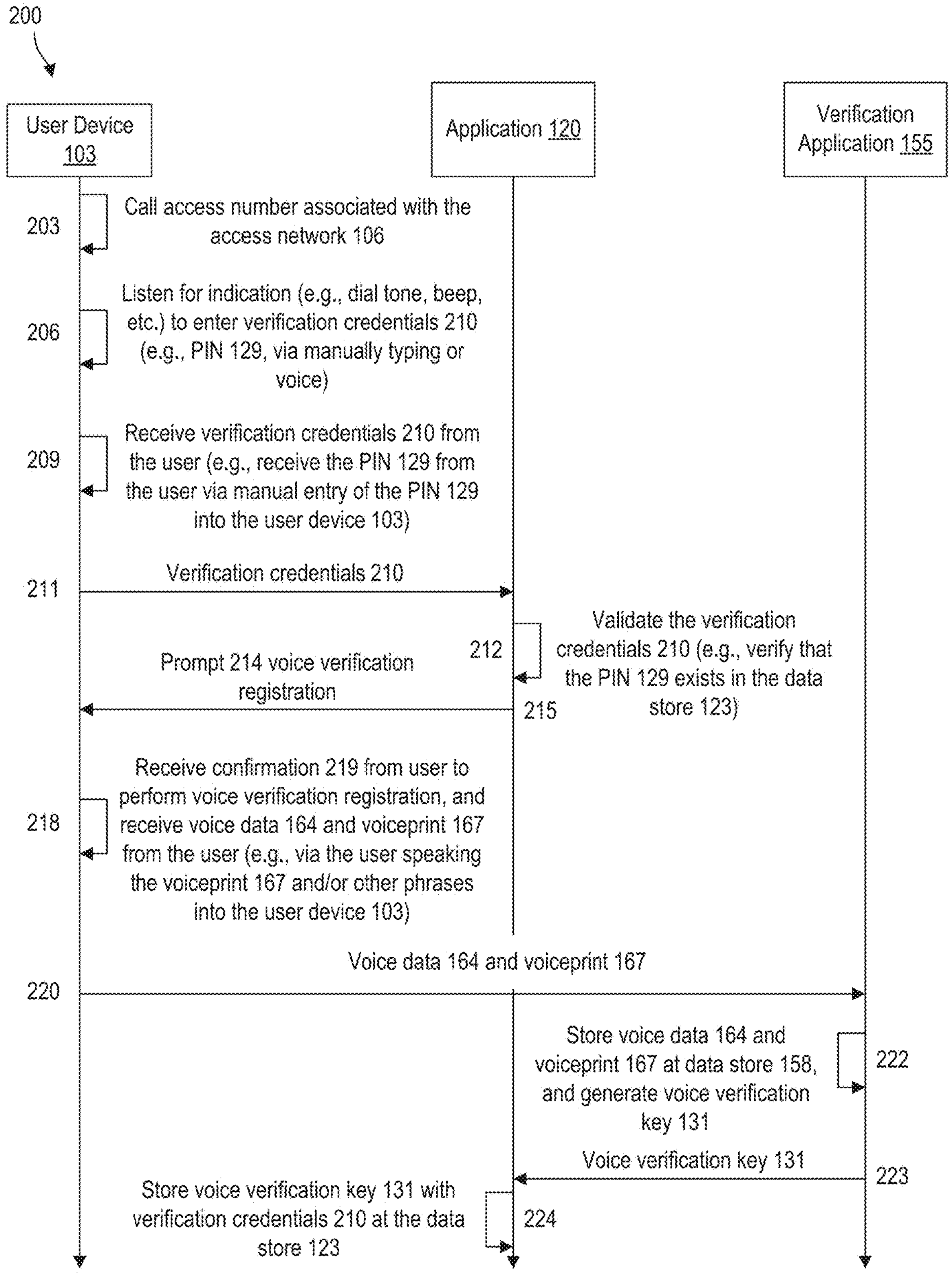
FIGS. 2A-D are block diagrams illustrating methods for using voice verification to provide emergency telecommunications services to user devices in the communication system of FIG. 1 according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, Government Emergency Telecommunications Service (GETS) is a priority telecommunication service that ensures that emergency/first responders, authorized national security, emergency personnel, and the like (sometimes referred to herein as "user") have prioritized access to communication networks during emergency situations. For example, the emergency personnel may first submit an application to a GETS system implementing GETS through the appropriate channels (e.g., by contacting a GETS program administrator or a designated authority responsible for managing GETS access). In the application, the user may submit eligibility credentials and/or other types of evidence verifying that the emergency personnel is indeed an emergency/first responder, national security personnel, government official, infrastructure, healthcare professional, or other emergency personnel. The GETS system (or the GETS program administrator or designated authority) may verify the submitted eligibility credentials, and when verified, issue verification credentials to the emergency personnel. The verification credentials may be issued in the form of a physical or digital card. The verification credentials may be, for example, a personal identification number (PIN) (e.g., 12-digit numerical PIN, or any other number of digits), an alphanumeric PIN, a unique identifier, or any other form of a verification credential. For example, the PIN (or other verification credential) may serve as an authentication key for accessing priority telecommunication services during emergencies.

During an emergency, the user may use a user device (e.g., mobile phone, landline phone, etc.) to initiate a call with a designated GETS line (e.g., an access number or phone number associated with a telecommunications service provider). After initiating the call, the user may listen (e.g., via a speaker of the device) for an indication (e.g., dial tone, beep, etc.) signaling to the user to enter the PIN (or other verification credential). The user may then manually enter each digit of the PIN via the keypad of the user device. Alternatively, the user may speak each digit of the PIN into the microphone of the user device (e.g., say "9"-"7"-"2"-etc. into the microphone).

When the user enters the PIN into the keypad of the user device, the PIN may be forwarded through an access network associated with the telecommunications service provider to a GETS application in the GETS system. When the user speaks the PIN into the microphone of the user device, a recording of the user speaking the PIN may be forwarded through the access network to the GETS application, and the GETS application may perform voice-to-text conversion (e.g., speech recognition) on the recording to obtain the PIN provided by the user. The GETS application then verifies the received PIN against stored credentials (e.g., the stored PIN) associated with active user accounts. When the PIN is valid and matches the stored credentials, the user is granted access to GETS. The GETS application may then prompt the user to provide a destination (e.g., destination phone number) to communicate with using GETS, and the user may input the destination into the user device (e.g., again via manual entry of the destination phone number using the keypad or speaking the destination phone number into the microphone). The GETS application may then connect the user device to the destination if the connection is permitted. As mentioned above, the connected call may be processed by the GETS system with priority, ensuring an expedited and secure connection that may be exempt from overload control (i.e., prevented from being disconnected during, for example, times of high network congestion).

In either case, for the user to receive access to the privileges of GETS (or any other type of emergency telecommunications service), the user may need to (1) remember a N-digit (e.g., 12-digit) PIN/have access to the card having the N-digit PIN during an emergency situation, and (2) manually enter or speak each digit of the PIN into the user device. Moreover, the manual entry or speaking of the PIN is often performed during a high-stress emergency situation. Therefore, the initial steps for GETS authentication is technically problematic for numerous reasons. First, manual PIN entry may lead to increased call setup time and call complexity, since manually entering the PIN via the keypad or voice is a time-intensive process. For example, the user may have to re-enter the PIN multiple times until the user can accurately enter the PIN (since the user may not be able to concentrate and manually enter the PIN accurately under stress in the emergency situation). In addition, the card including the PIN may be susceptible to loss and theft, and the PIN may be vulnerable to hacking, fraud, and other misuse. Lastly, manual entry of a 12-digit PIN may be susceptible to human error, which may result in the user losing prioritized access to the network during emergencies. Therefore, GETS authentication may be inefficient from a network resource and processing resource perspective due to the increased call setup time and call complexities involved in PIN authentication. Moreover, GETS authentication may be prone to error, which may again result in the loss of prioritized communications for those directly involved in emergency management and national security efforts.

The present disclosure addresses the foregoing technical problems by providing a technical solution in the technical field of authentication systems, and in particular, emergency telecommunications service systems (e.g., GETS systems). The embodiments disclosed herein may authenticate the users with the emergency telecommunications service (e.g., GETS) without the need for the user to manually enter the PIN (e.g., 12-digit PIN) or other verification credential. Instead, the emergency telecommunications service system may authenticate the user using automated voice verification (e.g., using voice biometrics capabilities) when the user has enrolled in voice verification services. Voice verification may be performed using a voiceprint (e.g., a passphrase) based not only on the voice of the user speaking the passphrase, but also on the content of the passphrase itself. In this way, the voice verification used to authenticate the user with the emergency telecommunications service system is a multi-factor authentication scheme, which is more secure than the afore-mentioned PIN-based authentication scheme used by GETS. Moreover, using voice verification to authenticate the user may reduce call setup time, reduce call complexity, and better secure the PIN against hacking and misuse.

The embodiments of voice verification disclosed herein may be implemented by an emergency telecommunications service system (e.g., a GETS system), a voice verification system, an access network owned and operated by a telecommunications service provider, and one or more user devices operated by emergency personnel users. The emergency telecommunications service system, voice verification system, and access network may all be part of a communication network, as will be further described below in FIG. 1.

In an embodiment, the emergency telecommunications service system may include an application that may communicate with the user devices and the voice verification system to perform voice verification of users prior to providing the user devices access to the emergency telecommunications services via the access network. Voice verification may only be performed for users that have enrolled in or registered with the voice verification system to use voice verification to authenticate with the emergency telecommunications service system. To enroll, the user device may call an access number (e.g., phone number associated with the telecommunications service provider of the access network) to request access to emergency telecommunications services. The user may then listen via a speaker of the user device for an indication (e.g., dial tone, beep, etc.) signaling the user to enter the PIN, and the user may then manually (e.g., via the keypad and through the microphone) enter the PIN into the user device. In this way, the user may have to manually provide the PIN at least once during the enrollment process. However, as described herein, the user may not need to manually provide the PIN to access the emergency telecommunications services once enrollment is complete.

After the user device has received the PIN from the user, the user device may transmit the PIN (either the manually typed PIN or the verbal speaking/recording of the PIN) to the application at the emergency telecommunications service system. The application may validate the PIN by verifying that the PIN is indeed stored in a user account at a database of the emergency telecommunications service system. After validating the PIN, the application may transmit a prompt for voice verification registration to the user device (e.g., the prompt may include a voice recording, text, or other type of notification to the user device requesting the user to perform voice verification registration).

The user may then respond to the prompt to confirm performance of voice verification registration in association with the PIN provided by the user. The user may respond to the prompt in various manners, for example, the user may speak into the microphone of the user device with a predefined phrase (e.g., "yes"), may manually enter a predefined numerical value (e.g., "1"), or may provide any other type of response signaling the confirmation to perform voice verification registration.

Once the confirmation is received, the application may instruct a verification application at the voice verification system to perform voice verification registration for the user operating the user device. To perform voice verification registration, the verification application may then transmit a prompt to the user to provide various forms of voice data and a voiceprint back to the voice verification system. The user may then provide the voice data and the voiceprint by speaking sample voice data and the voiceprint into the microphone of the user device. The voice data may include multiple voice samples (e.g., recordings of predefined phrases or terms spoken by the user into the microphone), which may be used by the verification application to extract specific features of the user's voice. For example, the voice samples may be based on enrollment phrases that cover a range of speech sounds/patterns, prompted statements showcasing the user's natural speaking style and voice modulation, randomly generated passages, digit sequences that capture variations in pitch, rhythm, pronunciation, accent, etc. The voiceprint may be a recording of the user speaking a particular passphrase into the microphone. The voiceprint may not only be used to identify or verify the speaker based on the vocal characteristics and nuances of the user's voice, but the passphrase (e.g., content) of the voiceprint may also be used to identify or verify the speaker. For example, the voiceprint may include a recording of the user speaking 4 digits of the PIN, such that the voice of the user in the recording may be used to authenticate the user and the 4 digits of the PIN may also be used to authenticate the user (e.g., multi-factor authentication).

The verification application may use the voice data and the voiceprint to perform voice verification registration for the user, such that the user may speak the passphrase of the voiceprint into the microphone of any device operated by the user to authenticate the user with the emergency telecommunications service. The verification application may generate a voice verification key after storing the voice data and the voiceprint in a data store of the voice verification system. The voice verification key may be a value (e.g., alphanumeric value) indicating that the voiceprint has been stored at the voice verification system for authentication of the user using voice verification. The verification application may transmit the voice verification key to the application at the emergency telecommunications service system. The application may then store the voice verification key in association with the PIN of the user (e.g., in a user account of the user). The association of the PIN with voice verification key indicates that the user identified by the PIN may authenticate with the emergency telecommunications service system using voice verification. Once the voice verification key is stored at the emergency telecommunications service system and the voice verification system, the user may have completed registration and enrollment to use voice verification.

After registration and enrollment have been performed, the user may authenticate using the voice passphrase of the voiceprint instead of the PIN. For example, the user may use the user device (or any other device with calling capabilities) to call the access number associated with the access network, and listen for the indication (e.g., dial tone, beep, etc.). Instead of manually entering the PIN, the user may directly speak a voice passphrase into the microphone of the user device. The user device may transmit a recording of the voice passphrase to the application of the emergency telecommunications service system. The application may identify that the credentials received from the user is in the form of a voice recording, not a PIN or other value that may be verified by the application. The application may store the recording of the voice passphrase, along with other data (e.g., time data and location data) associated with the reception of the voice passphrase, in a data store of the emergency telecommunications service system. The application may then transmit the recording of the voice passphrase to the voice verification system.

The verification application of the voice verification system may determine whether the voice passphrase in the recording matches (e.g., or is consistent with) a voiceprint stored at the voice verification system, and this determination may be performed using the voice data of the user stored at the voice verification system. For example, the voice passphrase may be spoken in a different pitch, rhythm, pronunciation, or other vocal feature of the user when compared to the voiceprint of the user, but the voice data may capture all the different possible pitches, rhythms, pronunciations, and other vocal features of the user. In this way, the verification application may determine whether voice passphrase in the recording matches a voiceprint stored at the voice verification system even when the vocal features of the user are different in both the voice passphrase and the voiceprint.

When the voice passphrase in the recording matches a voiceprint stored at the voice verification system, the verification application may obtain the voice verification key of the voiceprint and transmit the voice verification key back to the emergency telecommunications service system with an indication that the user is verified. The application of the emergency telecommunications service system may validate the voice verification key by verifying that the voice verification key is stored in a user account with an active, valid PIN. Once validated, the application may prompt the user for the destination and receive the destination from the user. The application may also verify that the user is permitted to complete a call with the destination based on one or more permissions associated with the PIN and stored in the user account. If permitted, the application may connect the user device to the destination via the access network.

When the voice passphrase in the recording does not match (e.g., is not consistent with) a voiceprint stored at the voice verification system, the verification application may transmit a message indicating a voice verification failure to the application at the emergency telecommunications service system. The application may store an indication of the voice verification failure and notify the user device of the voice verification failure. The application may also prompt the user to either retry voice verification, enter the PIN, or contact an administrator for assistance. For example, a single user device may attempt voice verification and/or PIN entry a maximum of three times within a predefined time period, before being locked out of the system (e.g., unable to receive access to emergency telecommunications services).

In some embodiments, the emergency telecommunications services system may maintain an access history associated with the user using the emergency telecommunications services. The access history may include, for example, device identifiers of user devices requesting access to and/or using the emergency telecommunications services, time and location data for using the emergency telecommunications services, connected destinations using the emergency telecommunications services, authentication types used when requesting access to the emergency telecommunications services (e.g., PIN-based authentication, voice verification, etc.), etc. The access history may also include data regarding prior voice verification registration prompts, such as, for example, a date and/or time of each prior voice verification registration prompt sent to a user device associated with a PIN, date and/or time of rejections of each prior voice verification registration prompt, an identification of a user device to which each prior voice verification registration prompt was sent, etc.

The data related to prior voice verification registration prompts may be used to determine when to prompt users for voice verification. In an embodiment, the emergency telecommunications service system may maintain rules for voice verification registration prompting. Each rule may include one or more conditions, based on the data related to prior voice verification registration prompts, which when met, indicate whether the user device is to be prompted or should not be prompted for voice verification registration. For example, a rule may indicate that a user device is to be prompted for voice verification registration when a most recent prior voice verification registration prompt was sent to the user associated with the PIN more than X number of days ago. Another rule may indicate that a user device is to be prompted for voice verification registration when the user associated with the PIN has never been prompted for voice verification. In this way, the user (who may be using different user devices each time) may not be repetitively prompted for voice verification registration in the middle of a high-stress situation when the user has a history of denying voice verification registration, thereby again increasing efficiency and reducing call setup time/complexity.

In an embodiment, the user may also update the voice verification registration, for example, with a new passphrase. Again, the user may use the user device to call the access number and listen to the indication. Instead of entering the PIN or speaking the voice passphrase, the user may instead speak a predefined passphrase (e.g., "update voice verification") or enter a predefined value (e.g., "5") to indicate that the user requests to update the voice verification registration. The spoken passphrase or entered value may be transmitted to the application at the emergency telecommunications service system, and the application may prompt the user device to enter verification credentials (e.g., enter the PIN or speak the passphrase of the currently registered voiceprint). The user may enter the verification credentials into the user device, and the application/verification application may validate the verification credentials prior to prompting the user device for the updated voiceprint. The user may then speak a new passphrase into the microphone of the user device as an updated voiceprint, which may then be forwarded to the verification application. The verification application stores the updated voiceprint, and in some cases, generates an updated voice verification key, which may then be transmitted to and stored at the emergency telecommunications service system.

As should be appreciated, the user devices referred to herein may not necessarily be owned by the user, but the user may instead call into the access line described above to use any device available in an emergency crisis. Similarly, the user devices may call an access line for any telecommunications service provider, to use the emergency telecommunications services using the underlying infrastructure for the respective service provider. The verification credential (e.g., PIN or voiceprint) may be the same regardless of the access line/telecommunications service provider used to provide the emergency telecommunications services to the user.

In this way, the embodiments disclosed herein serve to reduce call setup time and call complexity during call completion using emergency telecommunications services. The embodiments disclosed herein also provide for increased security for these services by utilizing a multi-factor authentication scheme, as opposed to a solely PIN-based authentication scheme. Therefore, in general, the embodiments disclosed herein also serve to increase system capacity by decreasing human errors and increasing call efficiency.

Turning now to FIG. 1, a communication network 100 is described. The communication network 100 includes one or more user devices 103 (sometimes referred to herein in the singular as "user device 103"), an access network 106, an emergency telecommunications service system 109 (e.g., a GETS system), a voice verification system 112, and network 115. Network 115 may be one or more private networks, one or more public networks, or a combination thereof, interconnecting the user devices 103, access network 106, emergency telecommunications service system 109, and voice verification system 112. While FIG. 1 illustrates the access network 106, emergency telecommunications service system 109, and voice verification system 112 as being separate from the network 115, it should be appreciated that in some embodiments, the access network 106, emergency telecommunications service system 109, and voice verification system 112 may be part of the network 115. While FIG. 1 illustrates the emergency telecommunications service system 109 as being separate from the voice verification system 112, it should be appreciated that in some embodiments, the emergency telecommunications service system 109 may include the voice verification system 112.

The user devices 103 may be devices, such as, for example, user equipment (UE), cell phone, a mobile phone, a smart phone, a tablet computer, a landline phone, a satellite phone, a public payphone, a government communication system, a voice over internet protocol (VoIP) phone, a laptop, a personal computer, or any other type of communication device that is compatible with the public switched telephone network (PSTN). Each of the user devices 103 may be operated by an emergency personnel (also referred to herein as a "user") that is registered with the emergency telecommunications service system 109. Each of the user devices 103 may not be necessarily owned by the user, but instead may simply be operated by the user as described herein. For example, the user device 103 may be a public payphone, or a cell phone owned by a friend of the user that the user is borrowing to make an emergency call. As described herein, the user device 103 may be any type of communication device that is capable of calling an access number associated with the access network 106.

The user devices 103 may be connected to the network 115 using a wired or wireless communication link (e.g., using a local area network or a base station, and communicating to the network 115 via a cellular or WiFi connection). For example, the user devices 103 may communicate with the network 115 according to a 5G, a long term evolution (LTE), a code division multiple access (CDMA), or a global system for mobile communications (GSM) wireless telecommunication protocol.

The access network 106 may be a telecommunications access network owned and operated by a telecommunications service provider. The access network 106 may leverage the infrastructure of PSTN and other communication networks. The access network 106 may include a radio access network (RAN) 117, a core network 119, and other network elements (e.g., routers, switches, gateways, bridges, virtual private networks (VPNs), virtual functions, etc.). The RAN 117 may facilitate wireless communication and may include various network elements, such as, for example, cell towers and base stations. The RAN 117 may allow authorized users to connect to the services using the user devices 103, providing flexibility and coverage in various locations. The core network 119 may handle the processing, routing, and management of the emergency communications, ensuring prioritized access for authorized users during emergencies.

In some cases, the RAN 117 is used by the emergency telecommunications service system 109 to provide prioritized access for registered users that have authenticated with the emergency telecommunications service system 109, using the authentication methods described herein. For example, prioritized access may ensure that communications initiated by the users are given precedence over non-priority communications and may not be hindered by network congestion. As described herein, once a user is authenticated with the emergency telecommunications service system 109, the user may request a connection (e.g., a call) to a destination phone number. If the connection is permitted, the emergency telecommunications service system 109 may complete the requested connection between the user device 103 by performing various prioritizing actions. For example, the emergency telecommunications service system 109 may complete the requested connection from the user device by dropping an on-going call of a non-emergency personnel to make a radio communication link in the RAN 117 available for the connection/preempt voice bearer admission for public user voice calls. As another example, the emergency telecommunications service system 109 may complete the requested connection from the user device by granting prioritized access to limited radio communication links in the RAN 117 to the user device 103.

The emergency telecommunications service system 109 (also referred to herein as the "emergency system 109" or "GETS system 109") may be a computer system, server software/hardware, or a collection of processors, memories, and/or networking resources used to perform voice verification with the user devices 103 and the voice verification system 112. The emergency system 109 may include an application 120, which may include instructions stored in a memory of the emergency system 109 that when executed by a processor of the emergency system 109, may cause the application 120 to perform various steps as disclosed herein. For example, the application 120 may perform the steps of methods 300 and 400 of FIGS. 3 and 4, respectively, as further described below.

The emergency system 109 may further include a data store 123. The data store 123 may include one or more memories located together or in a distributed manner. The data store 123 may store a user account 125 for one or more users that have completed the application and eligibility credentialing processes to receive a PIN 129 (e.g., in a card) that may be used to authorize access to the emergency telecommunications services provided by the emergency system 109. The user account 125 may include the value of the PIN 129, a voice verification key 131, permissions 134 associated with the user of the PIN 129, rules 135 for prompting the user to perform voice verification registration, and an access history 137 associated with the user of the PIN 129. The voice verification key 131 may be a value received from the voice verification system 112 indicating that the user has completed voice verification registration with the voice verification system 112. The permissions 134 may indicate actions (e.g., calls or types of calls) that the user may complete or may be prohibited from completing using the prioritized access provided by the emergency telecommunications services. The rules 135 may include one or more conditions related to prior prompts for voice verification registration sent to the user associated with the PIN 129, which when met, may indicate whether or not to send another prompt for voice verification registration.

The access history 137 may maintain on-going data describing each event occurring between a user device 103 of the user and the emergency system 109. For example, the access history 137 may include device identifiers 140 (e.g., automatic number identifications (ANIs) of the user devices 103 that have authenticated with the emergency system 109 using the PIN 129, the authentication type 143 performed by each user device 103 (e.g., PIN-based verification or voice verification), time data 146 describing the times that the user device 103 has called the emergency system 109 or that the emergency system 109 has prompted the user device 103 (e.g., for voice verification registration, for the PIN, for the destination, etc.), location data 149 describing the locations (e.g., geographical locations, serving cell site/towers, etc.) of the user devices 103 authenticating with the emergency system 109 or being prompted by the emergency system 109, destination data 152 identifying destination phone numbers that have been requested by the user devices 103 and/or for which a call has been completed. In some cases, the application 120 may collect this data upon the occurrence of each event between the user devices 103 and the emergency system 109 and add the data to the access history 137 in the user account 125.

The voice verification system 112 may be a computer system, server software/hardware, or a collection of processors, memories, and/or networking resources used to perform voice verification with the user devices 103 and the emergency system 109. The voice verification system 112 may include a verification application 155, which may include instructions stored in a memory of the voice verification system 112 that when executed by a processor of the voice verification system 112, may cause the verification application 155 to perform various steps as disclosed herein.

For example, when the user device 103 is registering or enrolling for voice verification, the user device 103 may transmit voice data 164 and a voiceprint 167 (passphrase) to the voice verification system 112. The voice data 164 may include multiple voice samples (e.g., recordings of predefined phrases or terms spoken by the user into a microphone of the user device 103), which may be used by the verification application 155 to extract specific features of the user's voice. For example, the voice samples may include enrollment phrases that may cover a range of speech sounds/patterns, prompted responses showcasing the user's natural speaking style and voice modulation, randomly generated passages, digit sequences that capture variations in pitch, rhythm, pronunciation, accent, etc. The voiceprint 167 may be a recording of the user speaking a particular passphrase into the microphone of the user device 103. The voiceprint 167 may not only be used to identify or verify the speaker/user based on the vocal characteristics and nuances of the user's voice, but the passphrase (e.g., content) of the voiceprint 167 may also be used to identify or verify the speaker/user. For example, the voiceprint 167 may include a recording of the user speaking 4 digits of the PIN 129, such that the voice of the user in the recording may be used to authenticate the user and the 4 digits of the PIN 129 may also be used to authenticate the user. The verification application 155 may generate a voice verification key 131 once the voice data 164 and the voiceprint 167 have been registered at the voice verification system 112.

The verification application 155 may use voice biometrics and other artificial intelligence/machine learning based algorithms to perform voice and speech recognition based on the voice data 164 received from the user and the voiceprint 167. For example, when a user device 103 requests use of the emergency telecommunications services, the user may provide a voice passphrase via the microphone of the user device 103 (ideally matching the voiceprint 167 of the user). The voice passphrase may be passed to the voice verification system 112, and the verification application 155 may compare the voice passphrase with the stored voiceprints 167 to identify a match (e.g., determine whether the voice passphrase is consistent with the voiceprint 167 at least to a threshold confidence level) using the voice data 164.

The voice verification system 112 may also include a data store 158. The data store 158 may include one or more memories located together or in a distributed manner. The verification application 155 may store the voice data 164 and the voiceprint 167 in association with each other at the data store 158 during voice verification registration of the user. The verification application 155 may also store the voice verification key 131 of the user after completing the voice verification registration of the user.

Figure 2B:
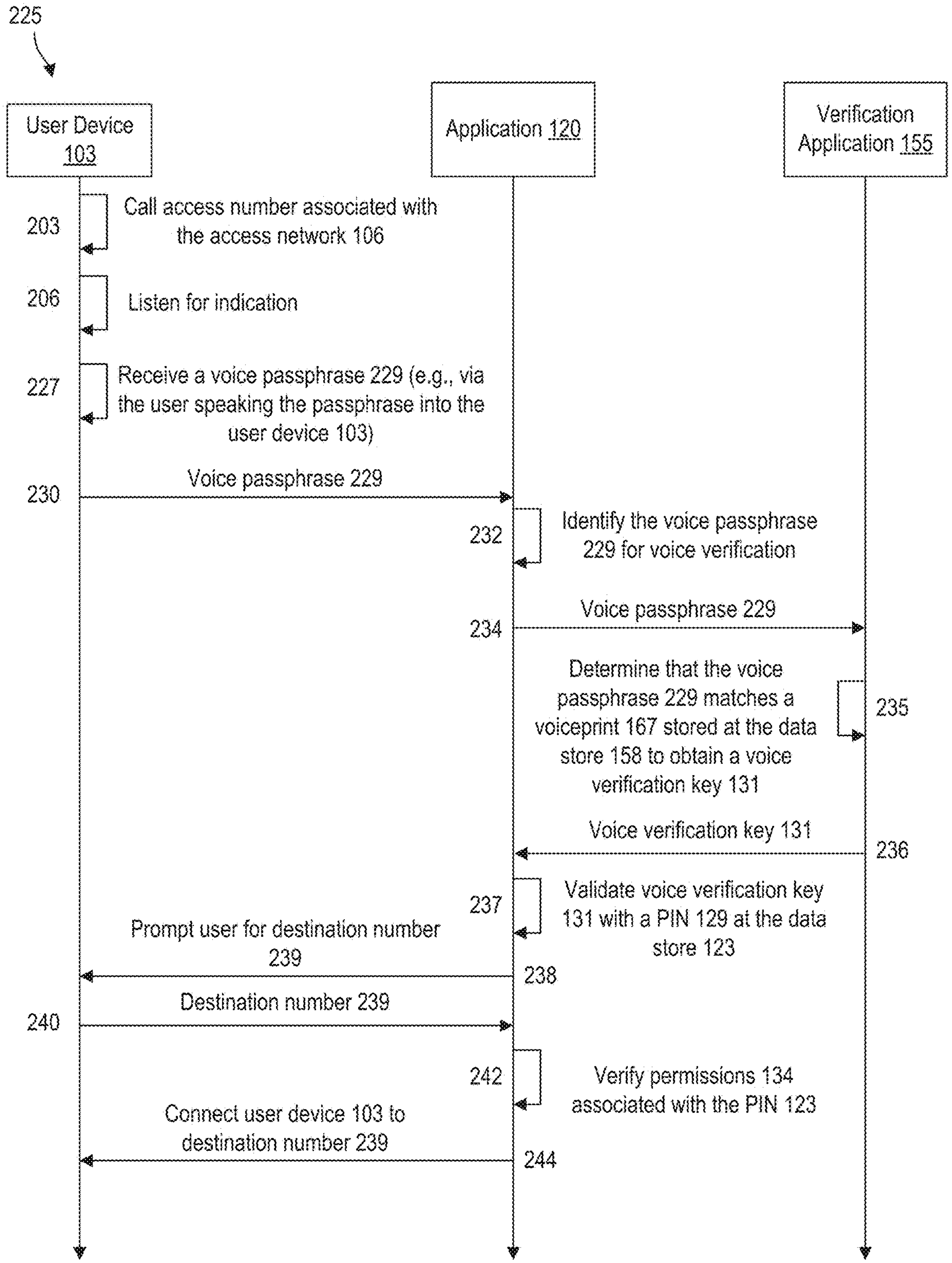
Figure 2C:
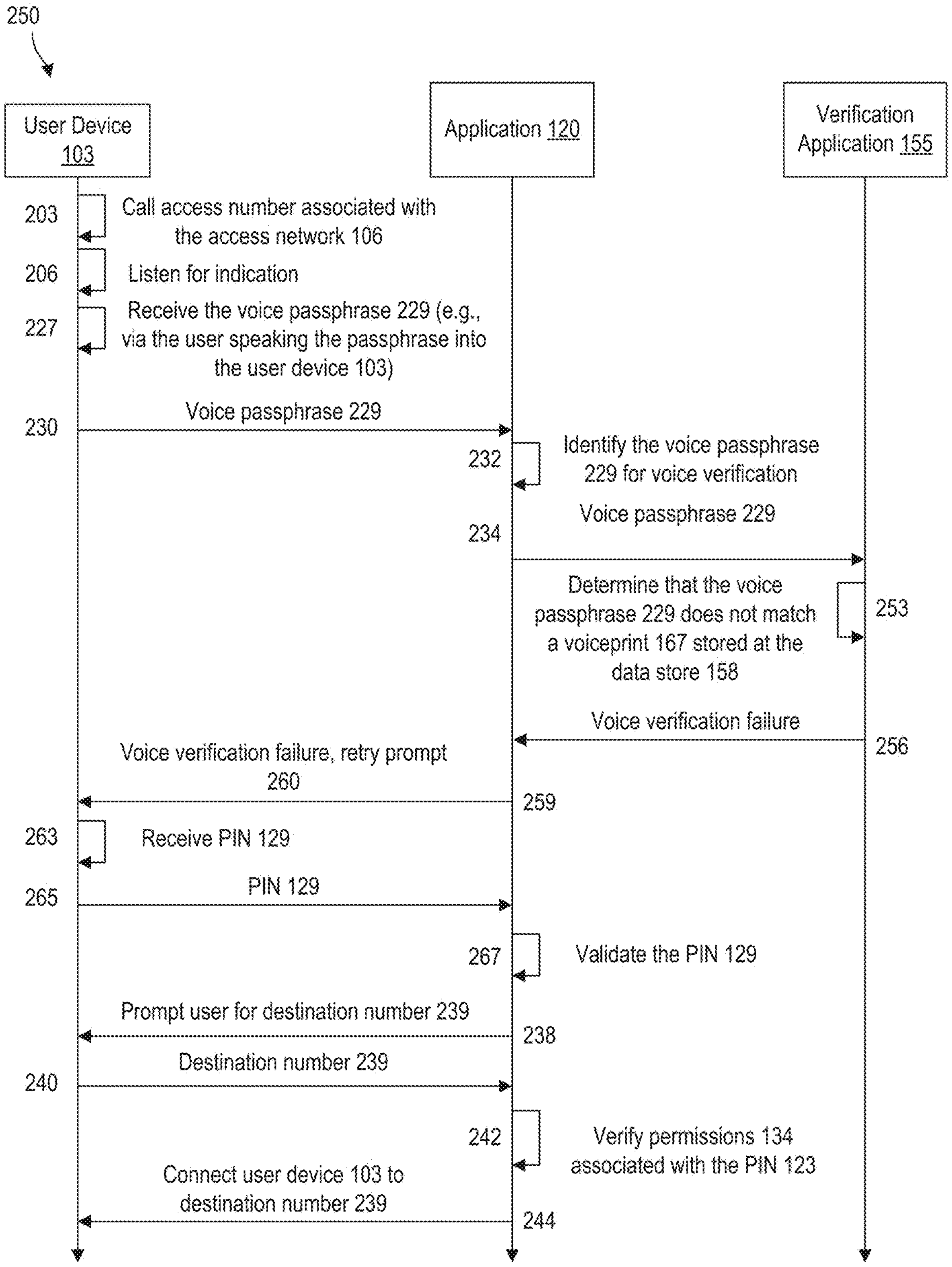
Figure 2D:
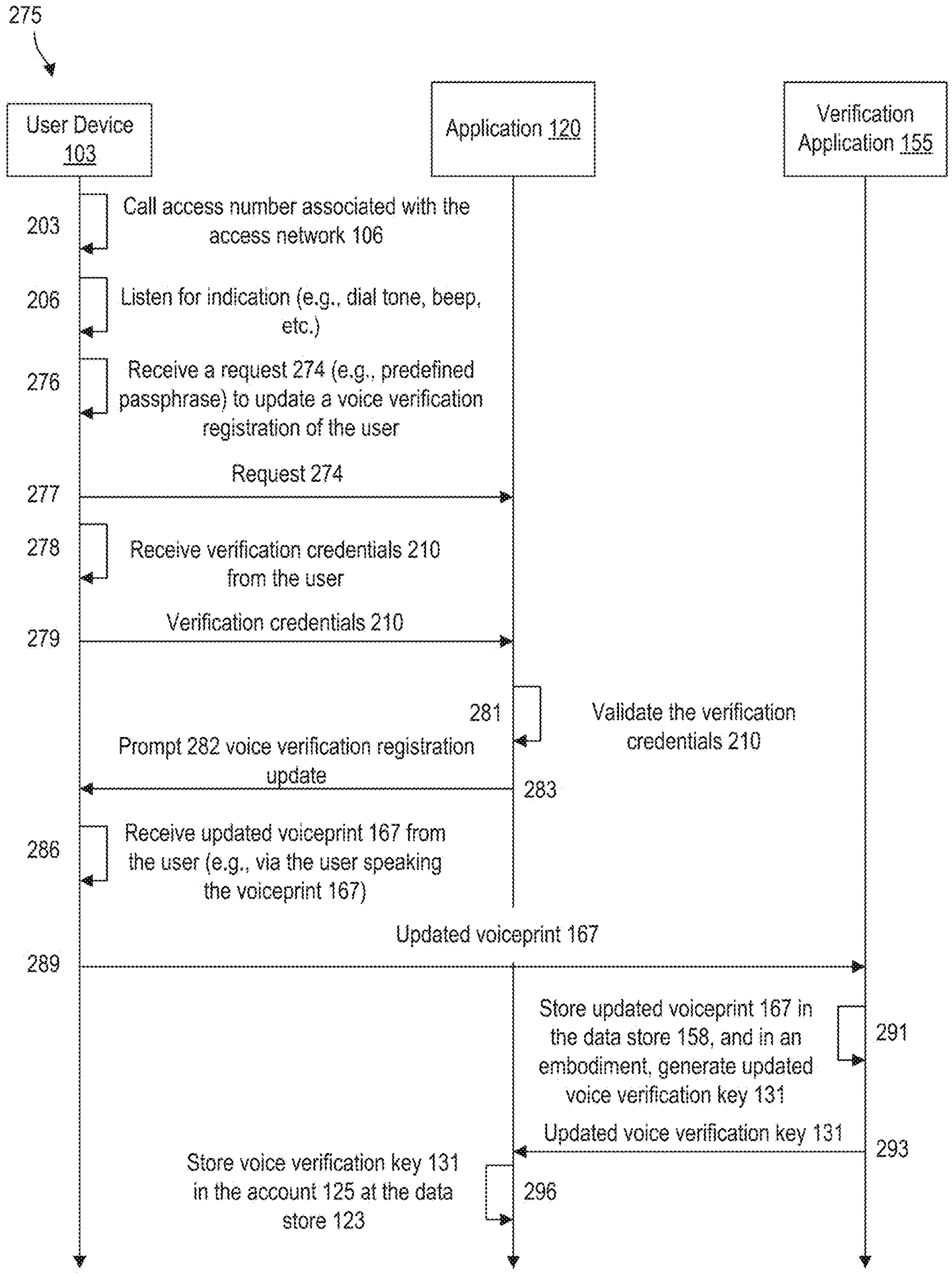

Referring now to FIGS. 2A, 2B, 2C, and 2D, shown are message sequence diagrams illustrating methods performed by the user device 103, the application 120 at the emergency system 109, and the verification application 155 at the voice verification system 112. In particular, FIG. 2A illustrates a message sequence diagram for performing voice verification registration for a user, FIG. 2B illustrates a message sequence diagram for using voice verification to authenticate a user to receive access to the emergency telecommunications services, FIG. 2C illustrates a message sequence diagram for performing PIN-based verification or voice verification to authenticate a user, and FIG. 2D illustrates a message sequence diagram for updating a voiceprint 167 of a user.

Referring now specifically to FIG. 2A, shown is a message sequence diagram illustrating a method 200 for performing voice verification registration for a user. At operation 203, a user operating the user device 103 may call an access number (e.g., phone number associated with the telecommunications service provider of the access network) to initiate a request to access emergency telecommunications services provided by the emergency system 109. At operation 206, the user may listen, via a speaker or headset of the user device 103, for an indication (e.g., dial tone, beep, etc.) signaling the user to enter verification credentials 210 of the user. The verification credentials 210 may include the PIN 129, another identifier or key uniquely assigned to the user to access and authenticate with the emergency system 109, and/or a voiceprint 167/voice passphrase. In the example shown in FIG. 2A, the user may not have performed voice verification registration yet, and as such, the verification credential 210 provided by the user may not be a registered voiceprint 167. At operation 209, the user device 103 may receive the verification credentials 210 (e.g., the PIN 129) from the user. For example, the user may manually type the PIN 129 into the keypad of the user device 103, or the user may individually speak each digit of the PIN 129 into the microphone of the user device 103. At operation 211, the user device 103 may transmit the verification credentials 210 to the application 120 of the emergency system 109. For example, when the user manually typed the PIN 129 into the user device 103, a string containing the value of the PIN 129 may be transmitted to the application 120. When the user individually spoke each digit of the PIN 129 into the user device 103, a recording of the user speaking each digit of the PIN 129 may be transmitted to the application 120, and a voice-to-text recognition algorithm may be used to translate the recording into the string containing the value of the PIN 129.

At operation 212, the application 120 may validate the verification credentials 210 (e.g., the PIN 129) received from the user. For example, the application 120 may verify that the PIN 129 exists or is stored in the data store 123 in association with an account 125 of a user that is active (e.g., still validly identifying an emergency personnel, still being invoiced for prioritized access, etc.). At operation 215, in response to validating the verification credentials 210 received from the user, the application 120 may transmit a prompt 214 for voice verification registration to the user device 103. For example, the prompt 214 may be transmitted as a voice recording, text, or other type of notification to the user device requesting the user to perform voice verification registration.

At operation 218, the user device 103 may receive a confirmation 219 from the user to perform voice verification registration in association with the PIN 129 provided by the user. The confirmation 219 may be provided to the user device 103 in various manners, for example, the user may speak into the microphone of the user device 103 with a predefined phrase (e.g., "yes"), may manually enter a predefined numerical value into the keypad (e.g., "1"), or may provide any other type of response providing the confirmation 219 to perform voice verification registration.

After providing the confirmation 219, the user device 103 may also receive the voice data 164 and the voiceprint 167 from the user. For example, the user may listen for another indication at the speaker or headset of the user device 103, signaling the user to provide the requested voice data 164 and then provide the voiceprint 167 (or vice-versa). For example, the user may listen for (or view on a screen of the user device 103) the enrollment phrases, prompted phrases, randomly generated passages, etc., that the user is to vocally repeat into the microphone at the user device 103. The user device 103 may package the voice data 164 to include the recordings of the spoken phrases/passages for processing, capturing all of the voice fluctuations and nuances of the user's voice. The user may also listen for (or view on a screen of the user device 103) a prompt to provide a voiceprint 167, with predefined content or user-specific content, such that both the voice of the user and the content of the voiceprint 167 may be used to authenticate the user. The user may then speak the voiceprint 167 (or the passphrase of the voiceprint 167 in the voice of the user) into the microphone of the user device 103 (possibly at least a threshold number of times using different pitches and voice fluctuations each time).

At operation 220, the user device 103 may transmit the voice data 164 and the voiceprint 167 to the verification application 155 at the voice verification system 112. Alternatively, the user device 103 may transmit the voice data 164 and the voiceprint 167 to the application 120 at the emergency system 109. The application 120 may locally store the voice data 164 and the voiceprint 167 and then forward the voice data 164 and the voiceprint 167 to the verification application 155.

At operation 222, the verification application 155 may store the voice data 164 and the voiceprint 167 at the data store 158, and generate the voice verification key 131 including a value indicating that the user has performed voice verification with the voice verification system 112. The verification application 155 may also store the voice verification key 131 in association with the voice data 164 and the voiceprint 167 at data store 158 of the voice verification system 112. At operation 223, the verification application 155 may transmit the voice verification key 131 to the application 120 of the emergency system 109. At operation 224, the application 120 may store the voice verification key 131 with the previously received verification credentials 210 (e.g., the PIN 129) at the data store 123, in the account 125.

In an embodiment, the application 120 may be detecting each operation of method 200 as an event, and may be recording details of the event into the access history 137 of the account 125 associated with the user. For example, the time data 146 and location 149 for operations 203, 209, 215, and 220 may be recorded in the access history 137, the validation of the verification credentials 210 at operation 212 may be recorded in the access history 137, the reception of the voice verification key 131 may be recorded in the access history 137, etc.

Referring now specifically to FIG. 2B, shown is a message sequence diagram illustrating method 225 for using voice verification to authenticate a user for receiving access to the emergency telecommunications services. Method 225 may begin with operations 203 and 206 from method 200, in which the user device 103 calls the access number associated with the access network 106, and waits for the indication to enter the verification credential 210.

At operations 227, the user device 103 may receive a voice passphrase 229 (e.g., instead of the PIN 129) from the user. The voice passphrase 229 may be a specific passphrase spoken with the voice of the user operating the user device 103. For example, the user may speak the voice passphrase 229 into the microphone of the user device 103. The voice passphrase 229 may be recorded by the user device 103, and at operation 230, the user device 103 may transmit the recording of the voice passphrase 229 to the application 120 at the emergency system 109.

At operation 232, the application 120 may identify the voice passphrase 229 for voice verification (i.e., identify that the received verification credential 210 is a voice passphrase 229 that is to be forwarded to the voice verification system 112 for verification). The application 120 may store the recording of the voice passphrase 229 locally. At operation 234, the application 120 may transmit the voice passphrase 229 to the verification application 155 of the voice verification system 112.

At operation 235, the verification application 155 may determine whether the voice passphrase 229 matches (e.g., is consistent with) a voiceprint 167 stored at the data store 158 of the voice verification system 112. The verification application 155 may use the voice data 164 (e.g., the voice samples received from the user and/or vocal features data obtained based on the voice samples) to identify a match between the received voice passphrase 229 and the stored voiceprint 167. For example, the voice passphrase 229 may be spoken in a different pitch, rhythm, pronunciation, or other vocal feature of the user when compared to the voiceprint 167 of the user, but the voice data 164 may capture all the different possible pitches, rhythms, pronunciations, and other vocal features of the user. The verification application 155 may use voice biometrics and other voice verification technologies to compare the voice passphrase 229 with the voiceprint 167 and identify permitted deviations between the voice passphrase 229 and the voiceprint 167. The permitted deviations between the voice passphrase 229 and the voiceprint 167 may be based on the identified vocal features from the voice data 164. When the voice passphrase 229 and the voiceprint 167 are within the permitted deviations, the voice passphrase 229 may be determined to match (or be consistent with) the voiceprint 167. In this way, the verification application 155 may determine whether voice passphrase 229 matches the voiceprint 167 stored at the data store 158 even when the vocal features of the user are slightly different in both the voice passphrase 229 and the voiceprint 167.

In some cases, the verification application 155 may use an artificial intelligence model (e.g., machine learning, neural networking, deep learning, etc.) to determine whether the voice passphrase 229 matches the voiceprint 167 stored at the data store 158. For example, the verification application 155 may use the artificial intelligence model to identify patterns and trends in the voice of the user using the voice data 164. The identified patterns and trends may be used to identify the vocal features of the user, which may be used to predict whether an incoming voice passphrase 229 matches the voiceprint 167, and may be used to determine a confidence level of the prediction. The confidence score may represent the level of certainty or confidence that the artificial intelligence model has in the prediction. For example, the confidence score may be a numerical value or percentage associated with a confidence of the prediction. The verification application 155 may determine that voice passphrase 229 matches the voiceprint 167 stored at the data store 158 when the confidence score is greater that a preset threshold. Alternatively, the verification application 155 may determine that voice passphrase 229 does not match the voiceprint 167 stored at the data store 158 when the confidence score is greater that a preset threshold.

When the voice passphrase 229 matches the voiceprint 167, the verification application 155 may generate the voice verification key 131 of the voiceprint 167. The voice verification key 131 may be a value unique to each voiceprint 167 stored at the data store 158 of the voice verification system 112. At operation 236, the verification application 155 may transmit the voice verification key 131 to the application 120 of the emergency system 109. At operation 237, the application 120 may validate the voice verification key 131 with a PIN 129 at the data store 123 of the emergency system 109. For example, the application 120 may verify that the voice verification key 131 is indeed stored in an active account 125 having a PIN 129 at the data store 123 to validate the voice verification key 131.

At operation 238, the application 120 may transmit a prompt to the user device 103 for a destination number 239 (e.g., phone number). For example, the prompt may be transmitted as a voice recording, text, or other type of notification to the user device requesting the user to provide a destination number 239. At operation 240, the user device 103 may receive the destination number 239 from the user and transmit the destination number 239 to the application 120 of the emergency system 109. For example, the user device 103 may receive the destination number 239 via the user manually entering each digit of the destination number 239 into the keypad of the user device 103 or from the user individually speaking each digit of the destination number 239 into the microphone of the user device 103.

At operation 242, the application 120 may verify that the user operating the user device 103 and authenticated by the PIN 129 (associated with the voice verification key 131 in the account 125) is permitted to place the call to the destination number 239 using the emergency telecommunications services provided by the emergency system 109. For example, the account 125 may include the permissions 134 of the user (e.g., that the user is not permitted to make long-distance calls), and the application 120 may verify that connecting the user device 103 to the destination number 239 is permitted based on the permissions 134 in the account 125 (e.g., that connecting the user device 103 to the destination number 239 would not be a long-distance call). At operation 244, the application 120 may place the call connecting the user device 103 to the destination number 239 using the prioritized access services provided by the emergency system 109 when the call is permitted.

In an embodiment, the application 120 may be detecting each operation of method 225 as an event, and may be recording details of the event into the access history 137 of the account 125 associated with the user. For example, the time data 146 and location data 149 for operations 203, 227, 230, and 236 may be recorded in the access history 137, and the destination number 239 requested by the user device 103 may be recorded in the access history 137.

Referring now specifically to FIG. 2C, shown is a message sequence diagram illustrating method 250 for performing PIN-based verification or voice verification to authenticate a user. Method 250 may begin with operations 203 and 206 from method 200, in which the user device 103 calls the access number associated with the access network 106, and waits for the indication to enter the verification credential 210. Method 250 may continue with operations 227, 230, 232, and 234, in which the user provides the voice passphrase 229, which is then forwarded to the verification application 155 at the voice verification system 112.

At operation 253, the verification application 155 may determine that the voice passphrase 229 does not match a voiceprint 167 stored at the data store 158 of the voice verification system 112. At operation 256, the verification application 155 may transmit a message indicating a voice verification failure to the application 120 at the emergency system 109. At operation 259, the application 120 may also transmit a message indicating the voice verification failure to the user device 103, with a prompt 260 for the user to either retry voice verification, enter the PIN, or contact an administrator. For example, the prompt 260 may be transmitted as a voice recording, text, or other type of notification to the user device 103.

At this stage, the user may decide that manually entering the PIN 129 may be more efficient than troubleshooting the voice verification failure. In this case, at operation 263, the user device 103 may receive the PIN 129 from the user (again, via manual entry of the PIN 129 through the keypad of the user device 103 or by speaking the PIN 129 into the microphone of the user device 103). At operation 265, the user device 103 may transmit the PIN 129 to the application 120 of the emergency system 109. At operation 267, the application 120 may validate the received PIN 129, by verifying that the PIN 129 exists or is stored in the data store 123 in association with an account 125 of a user that is active (similar to operation 212 of method 200). Subsequently, method 250 may continue with operations 238, 240, 242, and 244 from method 200, in which the user provides the destination number 239, and the application 120 may connect the user device 103 to the destination number 239 based on the permissions 134 in the account 125.

In an embodiment, the application 120 may be detecting each operation of method 250 as an event, and may be recording details of the event into the access history 137 of the account 125 associated with the user. For example, the time data 146 and location data 149 for operations 253, 259, and 263 may be recorded in the access history 137, and the destination number 239 requested by the user device 103 may be recorded in the access history 137.

Referring now specifically to FIG. 2D, shown is a message sequence diagram illustrating method 275 for updating a voiceprint 167 of a user. Method 275 may begin with operations 203 and 206 from method 200, in which the user device 103 calls the access number associated with the access network 106, and waits for the indication to enter the verification credentials 210. However, instead of entering the verification credentials 210, the user may instead enter a request 274 to update a voice verification registration of the user (e.g., by either speaking a predefined passphrase (e.g., "update voice verification") or entering a predefined value (e.g., "5") to indicate that the user requests to update the voice verification registration). At operation 276, the user device 103 may receive the request 274 to update the voice verification registration of the user. At operation 277, the user device 103 may transmit the request 274 to the application 120.

In some cases, the application 120 may then prompt the user to provide the verification credentials 210, or the user may enter the verification credentials 210 into the user device 103 as described herein. The verification credentials 210 may be the PIN 129 or a voice passphrase 229 matching the currently registered voiceprint 127. At operation 278, the user device 103 may receive the verification credentials 210 from the user, and at operation 279, the user device 103 may transmit the verification credentials 210 to the application 120 of the emergency system 109. At operation 281, the application 120 may validate the received verification credentials 210 by either verifying that the PIN 129 is stored in the data store 123 in association with an account 125, or passing the voice passphrase 229 to the verification application 155 of the voice verification system 112 for voice verification of the voice passphrase 229.

When the verification credentials 210 are validated (by either the application 120 and/or the verification application 155), at operation 283, the application 120 may transmit a prompt 282 for the voice verification registration update to the user device 103. For example, the prompt 282 may be transmitted as a voice recording, text, or other type of notification to the user device 103.

At operation 286, the user device 103 may receive an updated voiceprint 167 from the user. For example, the user may speak a new passphrase into the microphone of the user device 103 as an updated voiceprint 167. At operation 289, the user device 103 may transmit the updated voiceprint 167 to the verification application 155 of the voice verification system 112. At operation 291, the verification application 155 may store, in the data store 158 of the voice verification system 112, the updated voiceprint 167 in association with originally received voice data 164 and the voice verification key 131 of the user. The updated voiceprint 167 may either replace the previous voiceprint 167 or be added as a new voiceprint 167 and marked/flagged as the current voiceprint 167 in the data store 158. In an embodiment, the verification application 155 may generate an updated voice verification key 131 and store the updated voice verification key 131 in association with the updated voiceprint 167.

At operation 293, the verification application 155 may transmit the updated voice verification key 131 to the application 120 of the emergency system 109. At operation 296, the application 120 may store the updated voice verification key 131 in the account 125 at the data store 123 of the emergency system 109.

In an embodiment, the application 120 may be detecting each operation of method 275 as an event, and may be recording details of the event into the access history 137 of the account 125 associated with the user. For example, the time data 146 and location 149 for operations 276, 277, 278, 281, 283, 289, 293, and 296 may be recorded in the access history 137.

Figure 3:
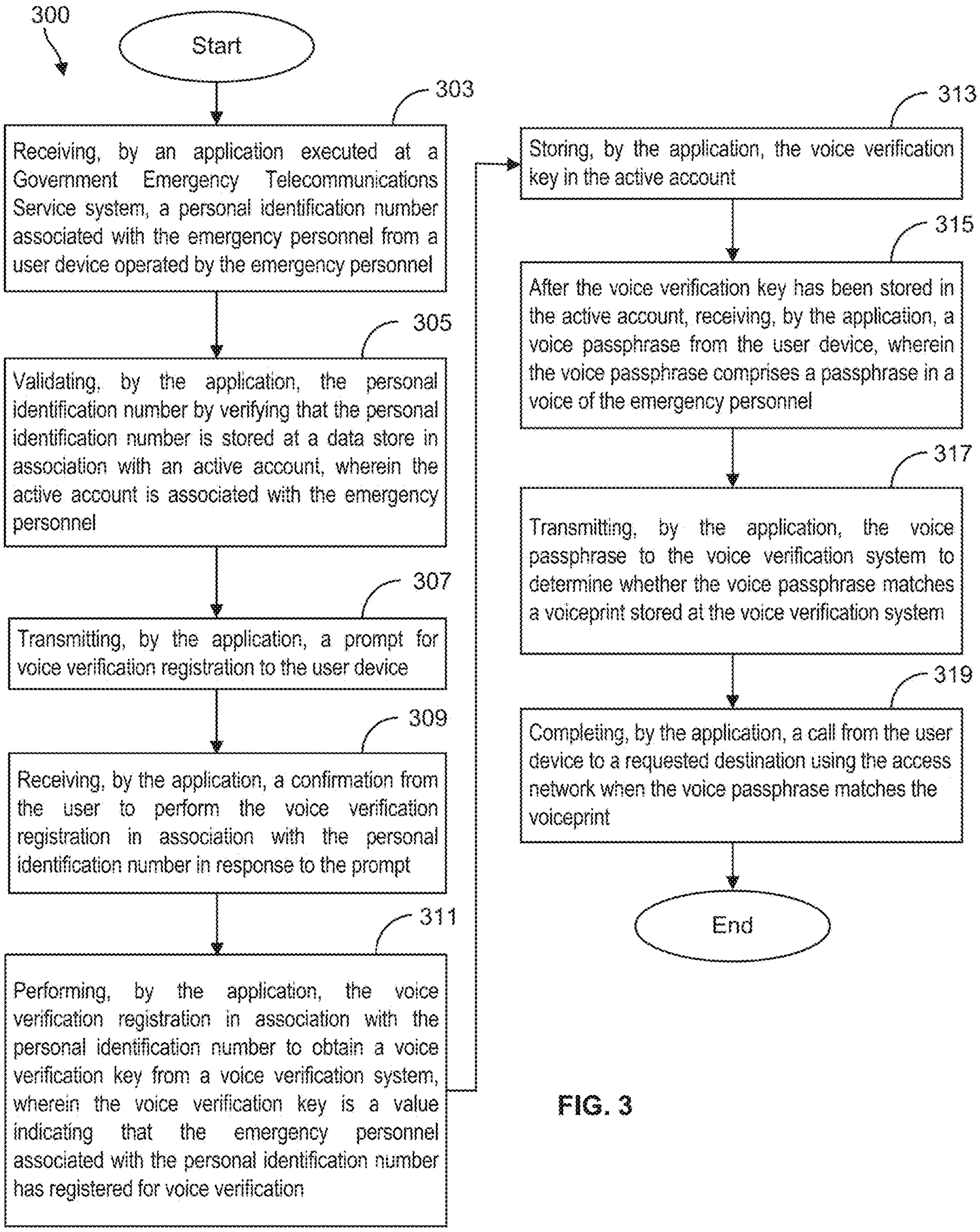
FIG. 3 is a flowchart of a first method of providing emergency telecommunications services using voice verification according to various embodiments of the disclosure.
Figure 5:
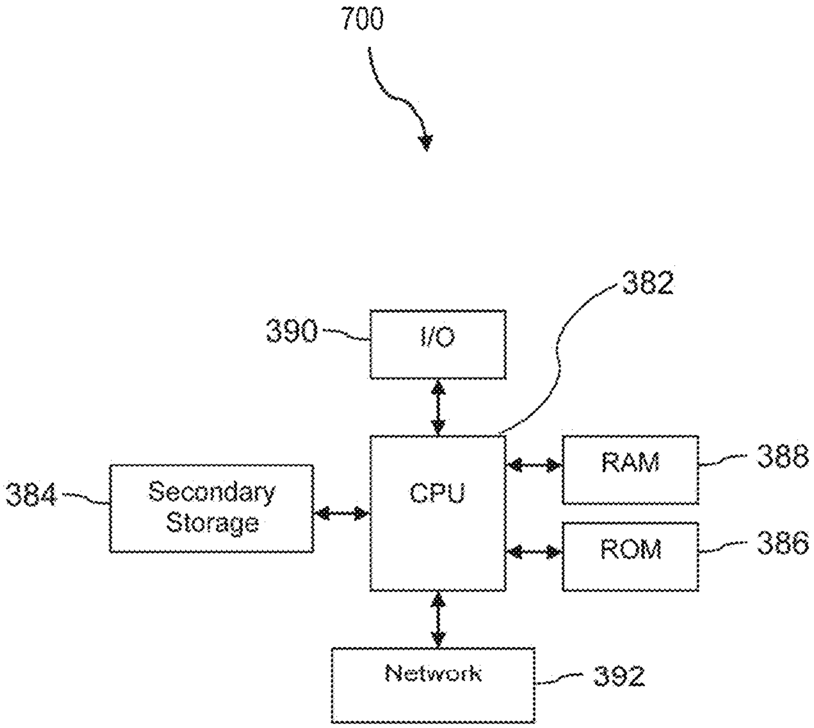
FIG. 5 is a block diagram of a computer system implemented within the communication system of FIG. 1 according to an embodiment of the disclosure.

Referring now to FIG. 3, shown is a method 300 of providing emergency telecommunications services using voice verification. Method 300 may be performed by the application of the emergency system 109, in communication with the verification application 155 of the voice verification system 112. In embodiments, the method 300 may be implemented using a computer system with components as shown in FIG. 5. As illustrated, method 300 of FIG. 3 includes a number of enumerated operations, but embodiments of the operations in FIG. 3 may include additional operations before, after, and in between the enumerated operations. In some embodiments, one or more of the enumerated operations may be omitted or performed in a different order. In the embodiment of method 300, the emergency system 109 provides GETS.

At step 303, method 300 comprises receiving, by an application 120 executed at an emergency system 109, a PIN 129 associated with the emergency personnel from a user device 103 operated by the emergency personnel. At step 305, method 300 comprises validating, by the application 120, the PIN 129 by verifying that the PIN 129 is stored at a data store 123 in association with an active account 125. The active account 125 is associated with the emergency personnel. At step 307, method 300 comprises transmitting, by the application 120, a prompt 214 for voice verification registration to the user device 103. At step 309, method 300 comprises receiving, by the application 120, a confirmation 219 from the user to perform the voice verification registration in association with the PIN 129 in response to the prompt 214.

At step 311, method 300 comprises performing, by the application 120, the voice verification registration in association with the PIN 129 to obtain a voice verification key 131 from a voice verification system 112. The voice verification key 131 is a value indicating that the emergency personnel associated with the PIN 129 has registered for voice verification. At step 313, method 300 comprises storing, by the application 120, the voice verification key 131 in the active account 125.

After the voice verification key 131 has been stored in the active account 125, method 300 may continue to step 315. At step 315, method 300 comprises receiving, by the application 120, a voice passphrase 229 from the user device 103. The voice passphrase 229 comprises a passphrase in a voice of the emergency personnel. At step 317, method 300 comprises transmitting, by the application 120, the voice passphrase 229 to the voice verification system 112 to determine whether the voice passphrase 229 matches the voiceprint 127 stored at the voice verification system. A determination of whether the voice passphrase 229 matches the voiceprint 127 may be multi-factored. First, the voice of the voice passphrase 229 may have to match (e.g., be consistent with) the voice of the user captured in the voiceprint 127 and the voice data 124 stored in the voice verification system 112 (received upon voice verification registration of the user). The determination of whether the voice of the voice passphrase 229 is the same as the voice in the voiceprint 127 may be based on whether the vocal features of the voice of the voice passphrase 229 is the same as the voice in the voiceprint 127, which may be based on voice biometrics and other voice analysis/recognition algorithms included in the voice verification system 112. Second, the content of the voice passphrase 229 may have to match (e.g., be the same as) the content of the voiceprint 127 stored at the voice verification system 112. For example, speech-to-text algorithms may be used to convert the voice passphrase 229 into text, which may be compared to a text of the voiceprint 167. The texts may be compared to determine whether the content of the voice passphrase 229 matches the content of the voiceprint 127. At step 319, method 300 comprises completing, by the application 120, a call from the user device 103 to a requested destination (e.g., destination number 239) using the access network 106 when the voice passphrase 229 matches the voiceprint 127.

Method 300 may include other steps and/or features that are not otherwise shown in FIG. 3. In an embodiment, performing the voice verification registration comprises receiving, by the application 120, a voiceprint 127 and voice data 124 from the user device 103, wherein the voiceprint 127 indicates a passphrase in the voice of the emergency personnel, and the voice data 124 comprises voice samples and voice features of the emergency personnel, transmitting, by the application 120, the voiceprint 127 and the voice data 124 to the voice verification system 112, and receiving, by the application 120, the voice verification key 131 associated with the PIN 129 from the voice verification system 112, wherein the voice verification key 131 indicates that the voiceprint 127 and the voice data 124 have been successfully stored at the voice verification system 112 for authentication of the emergency personnel using voice verification. In an embodiment, method 300 may comprise storing, by the application 120, the voice passphrase 229 in the data store 123 in association with a time and a location of the receiving the voice passphrase 229 from the user device 103. In an embodiment, prior to completing the call from the user device 103 to the requested destination, the method 300 may comprise receiving, by the application 120, the voice verification key 131 and an indication that the voice passphrase 229 matches the voiceprint 127 from the voice verification system 112, transmitting, by the application 120, a prompt for the requested destination to the user device 103, and receiving, by the application 120, the requested destination from the user device 103. In this embodiment, after receiving the requested destination from the user device 103, the method further comprises verifying, by the application 120, whether the emergency personnel is permitted to complete the call to the requested destination based on a permission 134 associated with the emergency personnel stored in the account 125.

In an embodiment, the prompt 214 for the voice verification registration is transmitted to the user device 103 based on a rule 135, and the rule 135 is based on at least one of a time of a prior voice verification registration being sent to the user device 103. In an embodiment, method 300 may further comprise receiving, by the application 120, a second voice passphrase 229 from the user device 103, the second voice passphrase 229 comprises a second passphrase in the voice of the emergency personnel, transmitting, by the application 120, the second voice passphrase 229 to the voice verification system 112 to determine whether the second voice passphrase 229 matches the voiceprint 127 stored at the voice verification system 112, receiving, by the application 120, a message indicating that voice verification has failed when the second voice passphrase 229 does not match the voiceprint 127 stored at the voice verification system 112, and transmitting, by the application, a prompt 260 indicating that voice verification has failed using the second voice passphrase 229. In this embodiment, method 300 may further comprise receiving, by the application 120, the PIN 129 from the user device 103 after transmitting the prompt 260 indicating that voice verification has failed using the second voice passphrase 229.

In an embodiment, method 300 may further comprise receiving, by the application 120, a request 274 to update the voice verification registration from the user device 103, receiving, by the application 120, the PIN 129 from the user device 103 after receiving the request 274, receiving, by the application 120, an updated voiceprint 127 from the user device 103, and transmitting, by the application 120, the updated voiceprint 127 to the voice verification system 112. The updated voiceprint 127 may include the same passphrase as the currently maintained voiceprint 127 for the user (but with different voice pitch fluctuations, for example), or the updated voiceprint 127 may be different from the currently maintained voiceprint 127.

Figure 4:
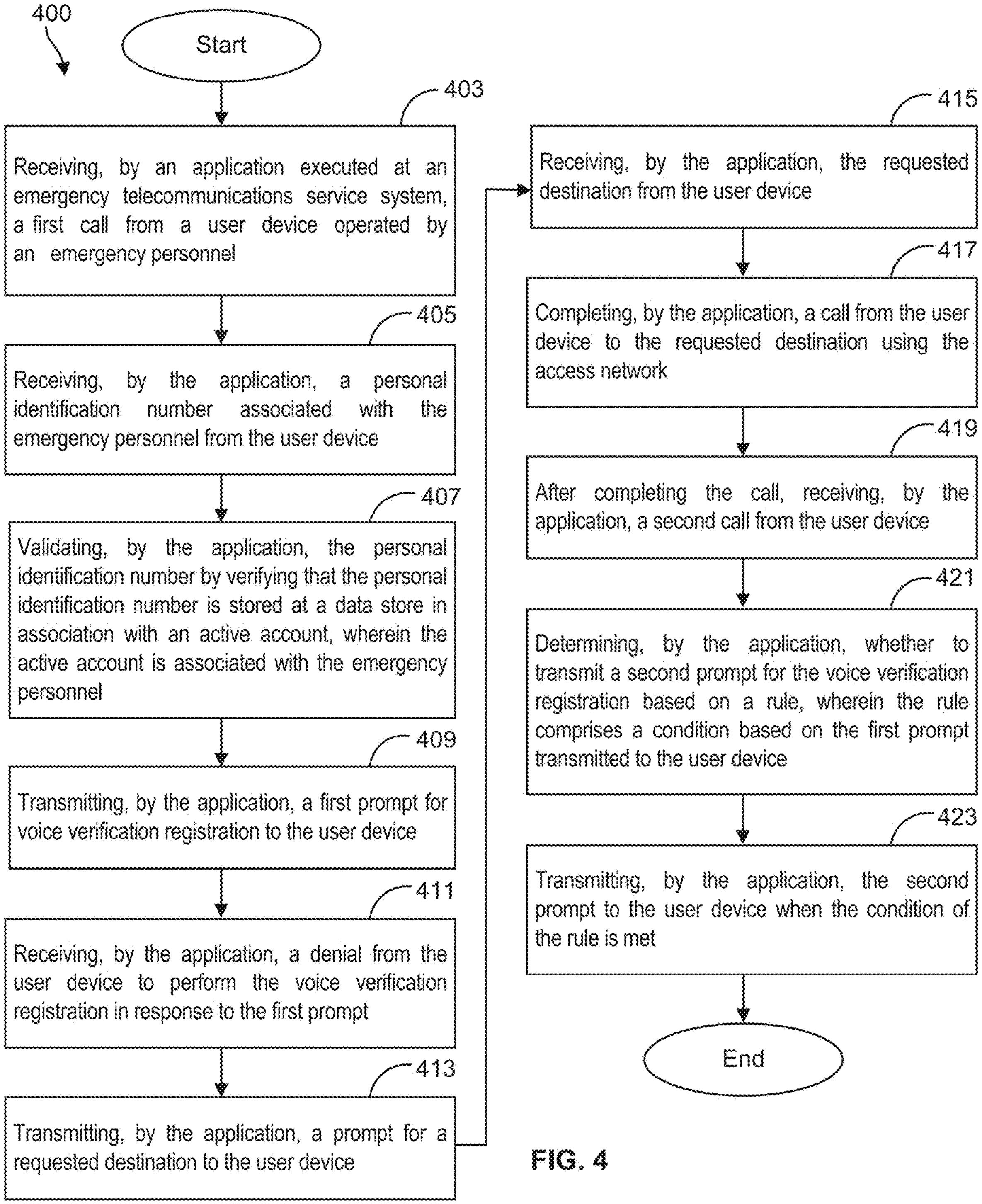
FIG. 4 is a flowchart of a second method of providing emergency telecommunications services using voice verification according to various embodiments of the disclosure.

Referring now to FIG. 4, shown is a method 400 of providing emergency telecommunications services using voice verification. Method 400 may be performed by the application of the emergency system 109, in communication with the verification application 155 of the voice verification system 112. In embodiments, the method 400 may be implemented using a computer system with components as shown in FIG. 5. As illustrated, method 400 of FIG. 4 includes a number of enumerated operations, but embodiments of the operations in FIG. 4 may include additional operations before, after, and in between the enumerated operations. In some embodiments, one or more of the enumerated operations may be omitted or performed in a different order. In the embodiment of method 400, the emergency system 109 provides GETS.

At step 403, method 400 comprises receiving, by an application 120 executed at the emergency telecommunications service system 109, a first call from a user device 103 operated by an emergency personnel. The emergency personnel may already be registered with the emergency telecommunications service system 109, may have in possession a PIN 129 that may be used to authenticate with emergency telecommunications service system 109.

At step 405, method 400 comprises receiving, by the application 120, a PIN 129 associated with the emergency personnel from the user device 103. At step 407, method 400 comprises validating, by the application, the PIN 129 by verifying that the PIN 129 is stored at a data store 123 in association with an active account 125. The active account 125 is associated with the emergency personnel. At step 409, method 400 comprises transmitting, by the application 120, a first prompt 214 for voice verification registration to the user device 103. At step 411, method 400 comprises receiving, by the application 120, a denial from the user device 103 to perform the voice verification registration in response to the first prompt 214. At step 413, method 400 comprises transmitting, by the application 120, a prompt for a requested destination (e.g., destination number 239) to the user device 103. At step 415, method 400 comprises receiving, by the application 120, the requested destination from the user device 103. At step 417, method 400 comprises completing, by the application 120, a call from the user device 103 to the requested destination using the access network 106.

After completing the call, method 400 may proceed to step 419. At step 419, method 400 comprises receiving, by the application 120, a second call from the user device 103. At step 421, method 400 comprises determining, by the application 120, whether to transmit a second prompt 214 for the voice verification registration based on a rule 135. The rule 135 comprises a condition based on the first prompt 214 (e.g., prior prompt for voice verification registration) transmitted to the user device 103. At step 423, method 400 may comprise transmitting, by the application 120, the second prompt 214 to the user device 103 when the condition of the rule 135 is met.

Method 400 may include other steps and/or features that are not otherwise shown in FIG. 4. In an embodiment, after receiving the second call and before determining whether to transmit the second prompt 214, the method 400 may further comprise receiving, by the application 120, the PIN 129 associated with the emergency personnel from the user device 103, and validating, by the application 120, the PIN 129 by verifying that the PIN 129 is stored at the data store 123 in association with the active account 125.

In an embodiment, method 400 may further comprise receiving, by the application 120, a confirmation 219 from the user device 103 to perform the voice verification registration in association with the PIN 129 in response to the second prompt 214, performing, by the application 120, the voice verification registration in association with the PIN 129 to obtain a voice verification key 131 from a voice verification system 112, the voice verification key 131 is a value indicating that the emergency personnel associated with the PIN 129 has registered for voice verification, and storing, by the application 120, the voice verification key 131 in the active account 125. In this embodiment, performing the voice verification registration comprises receiving, by the application 120, a voiceprint 127 and voice data 124 from the user device 103, the voiceprint 127 indicates a passphrase in a voice of the emergency personnel, and the voice data 124 comprises voice samples and voice features of the emergency personnel, transmitting, by the application 120, the voiceprint 127 and the voice data 124 to a voice verification system 112, and receiving, by the application 120, the voice verification key 131 associated with the PIN 129 from the voice verification system 112, the voice verification key 131 indicates that the voiceprint 127 and the voice data 124 have been successfully stored at the voice verification system 112 for authentication of the emergency personnel using voice verification. In this embodiment, the method 400 may further comprise storing, by the application 120, data associated with the first call, validating the PIN 129, the denial of the first prompt 214, the requested destination, the second call, and whether the second prompt 214 was transmitted to the user device 103 in an access history 137 associated with the emergency personnel.

FIG. 5 illustrates a computer system 700 suitable for implementing one or more embodiments disclosed herein. In an embodiment, the user devices 103, the emergency system 109, and/or the voice verification system 112 may each be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a communication network including an access network to provide emergency telecommunications services using voice verification, wherein the method comprises:

receiving, by an application executed at an emergency telecommunications service system, a first call from a user device operated by an emergency personnel;

receiving, by the application, a personal identification number associated with the emergency personnel from the user device;

validating, by the application, the personal identification number by verifying that the personal identification number is stored at a data store in association with an active account, wherein the active account is associated with the emergency personnel;

transmitting, by the application, a first prompt for voice verification registration to the user device;

receiving, by the application, a denial from the user device to perform the voice verification registration in response to the first prompt;

transmitting, by the application, a prompt for a requested destination to the user device;

receiving, by the application, the requested destination from the user device;

completing, by the application, a call from the user device to the requested destination using the access network; and after completing the call:

receiving, by the application, a second call from the user device;

determining, by the application, whether to transmit a second prompt for the voice verification registration based on a rule, wherein the rule comprises a condition based on the first prompt transmitted to the user device; and transmitting, by the application, the second prompt to the user device when the condition of the rule is met.

2. The method of claim 1, wherein after receiving the second call and before determining whether to transmit the second prompt, the method further comprises:

receiving, by the application, the personal identification number associated with the emergency personnel from the user device; and validating, by the application, the personal identification number by verifying that the personal identification number is stored at the data store in association with the active account.

3. The method of claim 1, further comprising:

receiving, by the application, a confirmation from the user device to perform the voice verification registration in association with the personal identification number in response to the second prompt;

performing, by the application, the voice verification registration in association with the personal identification number to obtain a voice verification key from a voice verification system, wherein the voice verification key is a value indicating that the emergency personnel associated with the personal identification number has registered for voice verification; and storing, by the application, the voice verification key in the active account.

4. The method of claim 1, wherein performing the voice verification registration comprises:

receiving, by the application, a voiceprint and voice data from the user device, wherein the voiceprint indicates a passphrase in a voice of the emergency personnel, wherein the voice data comprises voice samples and voice features of the emergency personnel;

transmitting, by the application, the voiceprint and the voice data to a voice verification system; and receiving, by the application, the voice verification key associated with the personal identification number from the voice verification system, wherein the voice verification key indicates that the voiceprint and the voice data have been successfully stored at the voice verification system for authentication of the emergency personnel using voice verification.

5. The method of claim 1, wherein completing the call from the user device to the requested destination using the access network comprises performing at least one of the following:

dropping an on-going call of a non-emergency personnel to make a radio communication link in the access network available to complete the call; or granting the user device prioritized access to limited radio communication links in the access network to complete the call.

* * * * *